UNITED STATES PATENT OFFICE.

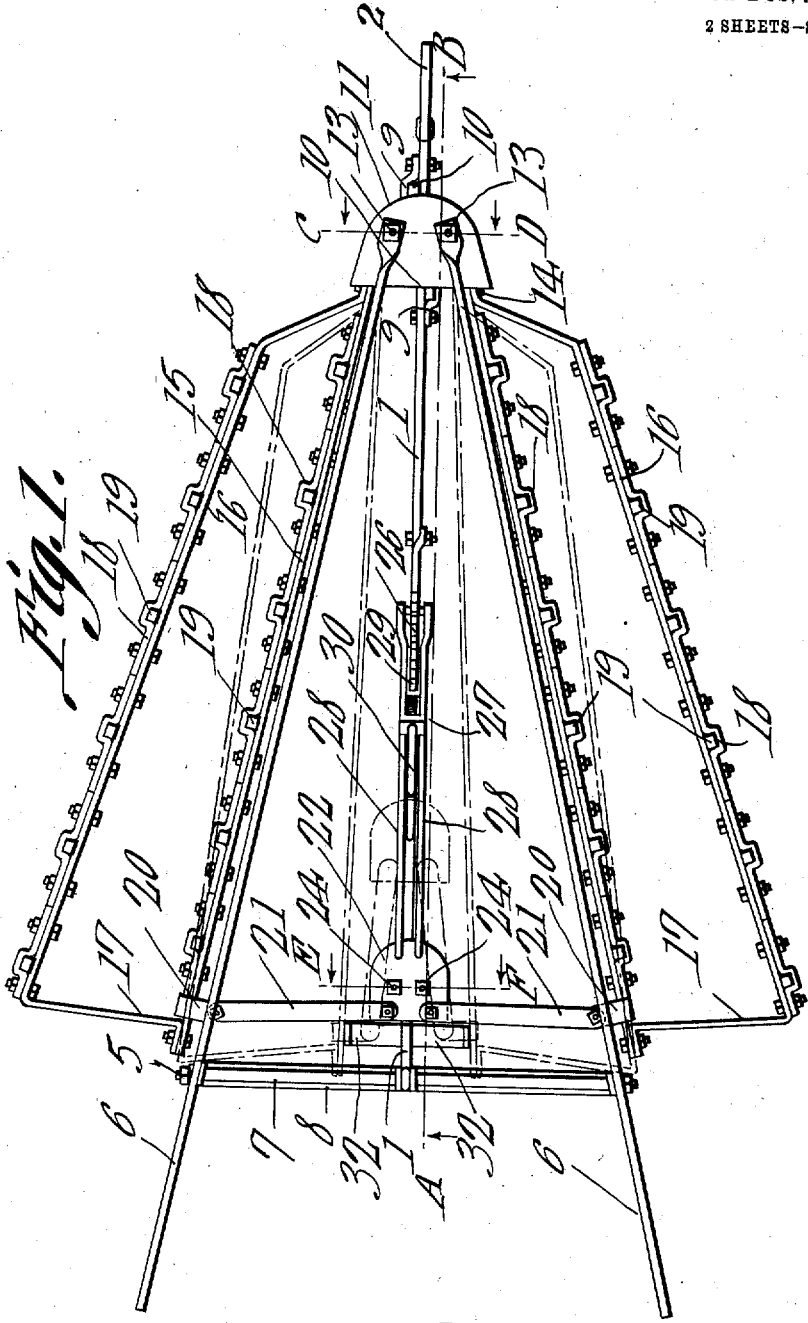

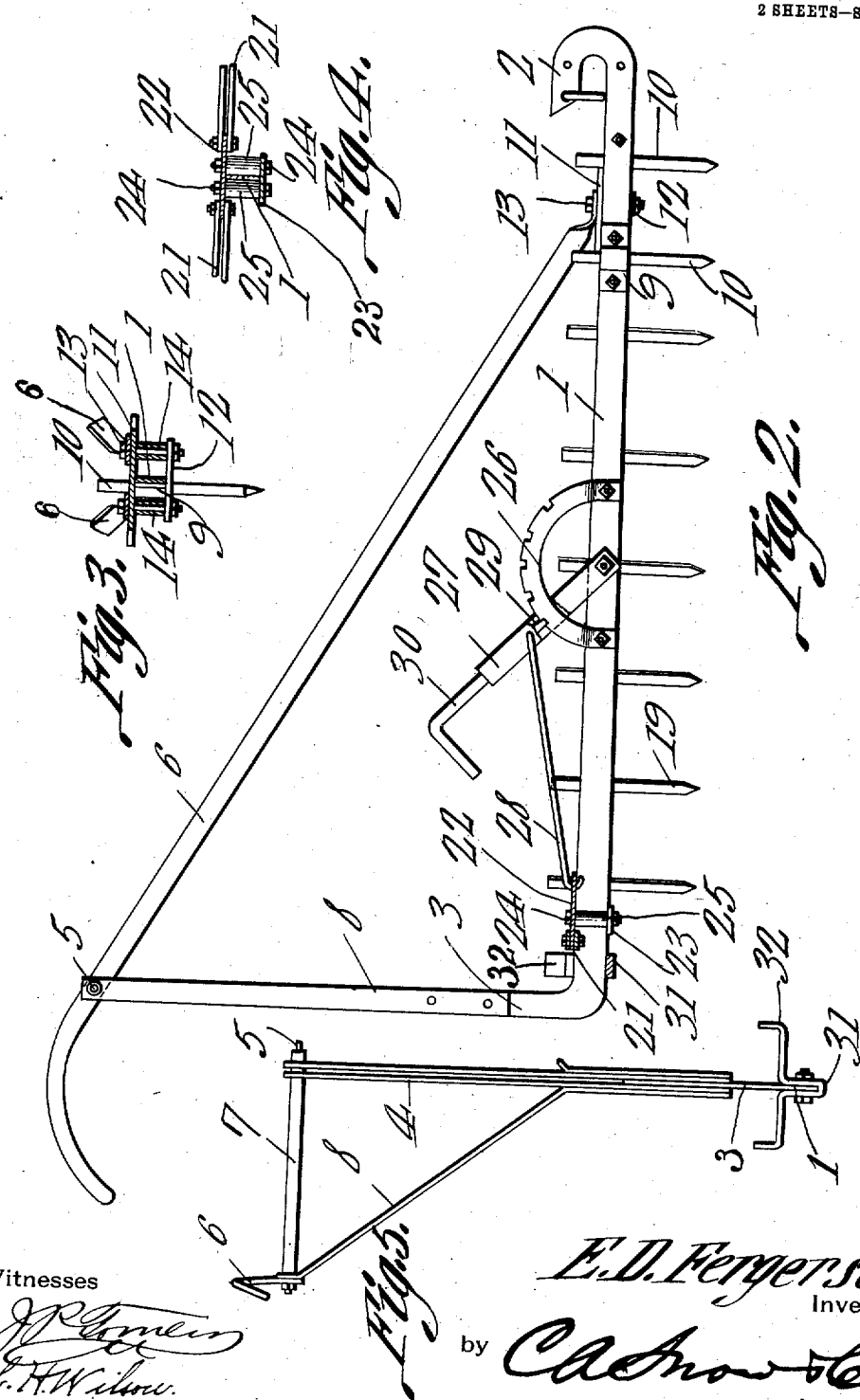

EDWARD D. FERGERSON, OF HILL CITY, TENNESSEE.

HARROW.

1,018,103. Specification of Letters Patent. Patented Feb. 20, 1912.

Application filed August 23, 1911. Serial No. 645,504.

*To all whom it may concern:*

Be it known that I, EDWARD D. FERGERSON, a citizen of the United States, residing at Hill City, in the county of Hamilton and State of Tennessee, have invented a new and useful Harrow, of which the following is a specification.

This invention relates to harrows and one of its objects is to provide bars of novel construction to which the teeth of the harrow are connected, these bars being provided with means whereby they can be simultaneously shifted toward or away from each other so as to vary the width of the harrow.

Another object is to provide a harrow the bars of which are arranged in groups, all of the bars of each group being formed in a single strip of metal.

A further object is to provide the harrow with a central bar on which shifting mechanism is mounted for the purpose of adjusting the harrow sections relative to each other.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is a plan view of a harrow constructed in accordance with the present invention. Fig. 2 is a section on line A—B Fig. 1. Fig. 3 is a section on line C—D Fig. 1. Fig. 4 is a section on line E—F Fig. 1, showing only the slidable members or carriage, the central beam, and the links connected to the carriage. Fig. 5 is a rear elevation of a portion of the harrow.

Referring to the figures by characters of reference 1 designates a central beam preferably of metal and having a clevis 2 at its forward end while its back end is extended upwardly, as at 3 and has a standard 4 secured thereto, said standard supporting a cross rod 5 the ends of which engage forwardly and downwardly converging handles 6. Spacing sleeves 7 are preferably interposed between the handles 6 and the standard 3 so as to hold the parts in proper relation. Braces 8 may be extended from the handles to the standard as shown.

Secured to the sides of the beam 1 near the clevis 2 are spaced straps 9, each strap being held in place by bolts or the like and serving to bind a harrow tooth 10 upon the beam 1. These teeth extend upwardly above the beam and resting on said beam between the upwardly projecting portions of the teeth 10 is a plate 11 extending laterally beyond the beam. Another plate 12 is arranged under the beam 1 and is connected to the plate 11 by bolts 13 or the like, these two plates 11 and 12 being clamped tightly on the beam. Moreover the teeth 10 serve to prevent the plate 11 from shifting longitudinally of the beam 1. The handles 6 are preferably secured in place at their forward ends by the bolts 13.

Pivotally mounted on each of the bolts 13 between the plates 11 and 12 is an eye 14 located at the front end of a bar 15. This bar is preferably straight from the eye to the other end of the bar and the eye of the bar 15 merges into another angular bar 16 which diverges rearwardly from the bar 15 and is provided at its back with an inwardly extending terminal portion 17 constituting means for spacing the two bars 15 and 16 and which is secured to the bar 15. Each of the bars 15 and 16 has straps or clips 18 bolted or otherwise fastened thereto and serving to hold harrow teeth 19 in position on the bars, these teeth corresponding with the teeth 10 hereinbefore described. A bracket 20 is secured to the rear portion of each bar 15 and extends inwardly therefrom and each of these brackets is connected, as by means of links 21, to a slide 22 arranged on the beam 1 near the rear end thereof. A retaining plate 23 extends transversely under the beam 1 and is connected to and moves with the plate 22, there being bolts 24 or the like provided for holding the parts 22 and 23 together. Rollers 25 are preferably mounted on these bolts and bear against the sides of the beam 1 so as to reduce friction to the minimum.

A toothed segment 26 is secured upon the front portion of beam 1 and is straddled by a lever 27. Links 28 connect this lever to the front portion of the slide 22 and serve to transmit motion to the slide from the lever. A spring pressed pawl 29 is movably mounted within the lever 28 and normally engages the segment 26, this pawl having a stem 30 projecting upwardly from the lever and by means of which it can be readily disengaged from the segment to permit the lever to be shifted to any desired position relative to said segment.

A yoke 31 embraces the beam near the rear end thereof and has laterally extending stop projections 32 for limiting the sliding movement of the plates 22 and 23 toward the rear end of the beam and also for limiting the movement of the bars 15 toward the beam 1.

It will be apparent that when lever 27 is swung forwardly the links 28 pull on the plate or slide 22, thus causing links 21 to pull inwardly on bracket 20 and thus fold the bars toward the beam 1. By shifting the slide 22 toward the rear end of the beam 1 the bars 15 can be moved apart. As the bars 15 and 16 are connected together, they will of course move in unison.

Importance is attached to the specific construction of the bars because this results in a durable and compact structure which will not readily get out of order.

It will be readily understood that the bars 16 may be multiplied to any desired extent, in order to increase the number of teeth. This expedient may be desirable when it is necessary to pulverize the soil unusually fine.

What is claimed is:—

1. A harrow including a central beam having a clevis at one end, connecting plates clamped upon the beam adjacent the clevis, harrow teeth secured on the beam and constituting means for holding said plates against displacement longitudinally of the beam, a group of rigidly connected tooth carrying bars at each side of the beam, each group having a common pivot, a slide engaging the beam, link connections between the slide and the groups of bars, means upon the beam for shifting the slide, and stop devices connected to the beam and interposed between the bars.

2. A harrow including a central beam having a clevis at one end, connecting plates upon opposite faces of the beam, bolts engaging the plates for binding them on the beam, a group of tooth carrying bars at each side of the beam, the bars in each group being rigidly connected, there being an eye upon each group and engaging one of the said bolts, a slide upon the central beam, means for shifting the slide, said means being mounted on the beam, link connections between the slide and the bars, and means secured to the beam and extending laterally therefrom for limiting the backward movement of the slide and the inward movement of the bars.

In testimony that I claim the foregoing as my own, I have hereto affixed my signature in the presence of two witnesses.

EDWARD D. $\underset{\text{mark}}{\overset{\text{his}}{\times}}$ FERGERSON.

Witnesses:
W. A. SCHOOLFIELD,
H. W. SCHOOLFIELD.

---

Copies of this patent may be obtained for five cents each, by addressing the "Commissioner of Patents, Washington, D. C."